(12) United States Patent
Ostroverkhov et al.

(10) Patent No.: US 10,960,607 B2
(45) Date of Patent: Mar. 30, 2021

(54) SYSTEMS AND METHODS FOR MONITORING POWDER SPREADING IN ADDITIVE MANUFACTURING SYSTEMS

(71) Applicant: General Electric Company, Schenectady, NY (US)

(72) Inventors: Victor Petrovich Ostroverkhov, Ballston Lake, NY (US); Jason Harris Karp, Niskayuna, NY (US)

(73) Assignee: General Electric Company, Schenectady, NY (US)

( * ) Notice: Subject to any disclaimer, the term of this patent is extended or adjusted under 35 U.S.C. 154(b) by 92 days.

(21) Appl. No.: 16/219,432

(22) Filed: Dec. 13, 2018

(65) Prior Publication Data

US 2020/0189193 A1 Jun. 18, 2020

(51) Int. Cl.
| | | |
|---|---|---|
| *G06T 7/11* | (2017.01) | |
| *B33Y 50/02* | (2015.01) | |
| *B29C 64/153* | (2017.01) | |
| *B29C 64/214* | (2017.01) | |
| *B29C 64/393* | (2017.01) | |
| *G06K 9/32* | (2006.01) | |
| *G06T 7/00* | (2017.01) | |

(Continued)

(52) U.S. Cl.
CPC .......... *B29C 64/393* (2017.08); *B29C 64/153* (2017.08); *B29C 64/214* (2017.08); *G06K 9/3233* (2013.01); *G06T 7/001* (2013.01); *G06T 7/11* (2017.01); *B33Y 50/02* (2014.12)

(58) Field of Classification Search
CPC ......... B33Y 50/02; B33Y 10/00; B33Y 30/00; B33Y 80/00; G05B 19/4099; G05B 2219/49023; G05B 2219/49018; G05B 19/4063; G05B 2223/02; G05B 23/0283; G05B 2219/32368; G06T 7/001; G06T 7/11; B29C 64/393; B29C 64/214; B29C 64/153; G06K 9/3233
USPC .................................................. 700/118, 119
See application file for complete search history.

(56) References Cited

U.S. PATENT DOCUMENTS 5,746,127 A * 5/1998 Fischbeck ................. B41C 1/14
101/123
9,724,876 B2 8/2017 Cheverton et al.
(Continued)

FOREIGN PATENT DOCUMENTS

EP 3187285 A1 7/2017
WO 2017015241 A1 1/2017
(Continued)

*Primary Examiner* — Michael J Brown
(74) *Attorney, Agent, or Firm* — Armstrong Teasdale LLP

(57) ABSTRACT

An additive manufacturing system is configured to manufacture a component. The additive manufacturing system includes a build platform, a recoater, a monitoring camera, and a controller. The component is disposed on the build platform. The recoater includes a recoater blade configured to spread a powdered build material across the build platform and the component forming a powder bed. The monitoring camera is positioned to image the recoater blade. The monitoring camera is configured to acquire a plurality of images of the recoater blade. The controller is configured to receive the plurality of images from the monitoring camera. The controller is configured to detect defects in the powder bed based on the plurality of images received from the monitoring camera.

16 Claims, 6 Drawing Sheets

(51) Int. Cl.
  *B33Y 80/00* (2015.01)
  *B33Y 10/00* (2015.01)
  *G05B 19/40* (2006.01)
  *G05B 23/02* (2006.01)

(56) References Cited

U.S. PATENT DOCUMENTS

| | | |
|---|---|---|
| 9,956,612 B1 | 5/2018 | Redding et al. |
| 10,217,653 B2 * | 2/2019 | Baek ................. H01L 21/67092 |
| 2015/0017882 A1 * | 1/2015 | Greenslet ............... B23Q 17/09 |
| | | 451/36 |
| 2015/0165683 A1 | 6/2015 | Cheverton et al. |
| 2015/0177158 A1 | 6/2015 | Cheverton |
| 2016/0229005 A1 | 8/2016 | Ryan et al. |
| 2017/0090462 A1 | 3/2017 | Dave et al. |
| 2017/0120337 A1 | 5/2017 | Kanko et al. |
| 2018/0161925 A1 | 6/2018 | Harding |
| 2019/0039198 A1 * | 2/2019 | Sugiura .............. B23Q 17/2404 |

FOREIGN PATENT DOCUMENTS

| | | |
|---|---|---|
| WO | 2017147434 A1 | 8/2017 |
| WO | 2017177070 A1 | 10/2017 |
| WO | 2018111564 A1 | 6/2018 |

* cited by examiner

SYSTEMS AND METHODS FOR MONITORING POWDER SPREADING IN ADDITIVE MANUFACTURING SYSTEMS

BACKGROUND

The field of the disclosure relates generally to additive manufacturing systems, and more particularly, to systems and methods for monitoring powder spreading in additive manufacturing systems.

At least some additive manufacturing systems involve the buildup of a powdered material to make a component. These techniques can produce complex components from powder materials at a reduced cost and with improved manufacturing efficiency. At least some known additive manufacturing systems, such as DMLM systems, fabricate components using a laser device, a build platform, a recoater, and a powder material, such as, without limitation, a powdered metal. The laser device generates a laser beam that melts the powder material on the build platform in and around the area where the laser beam is incident on the powder material, resulting in a melt pool. The melt pool cools into a consolidated, solid top layer of the component. The build platform is lowered by some amount, for example, 10 to 100 microns and the recoater spreads additional powered build material over the top layer. Alternatively, the powder dispensing and the laser device may be translated up, the recoater spreads the next layer of powder on the previously consolidated powder bed, and the laser device consolidates the new layer at a new height. The process is repeated until a completed component is manufactured by the system. However, defects, such as short feeds or sink holes, may form in the powder bed which would subsequently lead to a component defect or build failure if the powder bed defects are not detected and corrected. Specifically, with regards to the sink hole, as additional layers are formed on the previous layers, the sink hole may expand, forming an unintended void in the powder bed which can compromise integrity of the manufactured component. Monitoring and detection of potential defects in the powder bed can prevent a component defect from forming, improving the yield of the additive build and thus reducing costs of the manufacturing process.

BRIEF DESCRIPTION

In one aspect, an additive manufacturing system configured to manufacture a component is provided. The additive manufacturing system includes a build platform, a recoater, a monitoring camera, and a controller. The component is disposed on the build platform. The recoater includes a recoater blade configured to spread a powdered build material across the build platform and the component forming a powder bed. The monitoring camera is positioned to image the recoater blade. The monitoring camera is configured to acquire a plurality of images of the recoater blade. The controller is configured to receive the plurality of images from the monitoring camera. The controller is configured to detect defects in the powder bed based on the plurality of images received from the monitoring camera.

In another aspect, a controller for use in an additive manufacturing system is provided. The additive manufacturing system includes a build platform, a recoater, a monitoring camera, and a controller. The recoater includes a recoater blade. The monitoring camera is positioned to image the recoater blade. The monitoring camera is further configured to acquire a plurality of images of the recoater blade. The controller includes a processing device and a memory device coupled to the processing device. The controller is configured to receive the plurality of images from the monitoring camera. The controller is further configured to analyze the plurality of images detects at least one defect in a powder bed based on the plurality of images of the recoater.

In yet another aspect, a method of manufacturing a component with an additive manufacturing system is provided. The additive manufacturing system includes a build platform, a recoater, a monitoring camera, and a controller. The recoater includes a recoater blade. The monitoring camera is positioned to image the recoater blade. The monitoring camera is configured to acquire a plurality of images of the recoater blade. The component is disposed on the build platform. The method includes spreading a powdered build material on the build platform and the component using the recoater to form a powder bed. The method also includes acquiring a plurality of images of the recoater using the monitoring camera. The method further includes analyzing the plurality of images of the recoater using the controller to detect at least one defect in the powder bed.

DRAWINGS

These and other features, aspects, and advantages of the present disclosure will become better understood when the following detailed description is read with reference to the accompanying drawings in which like characters represent like parts throughout the drawings, wherein.

Figure 1:
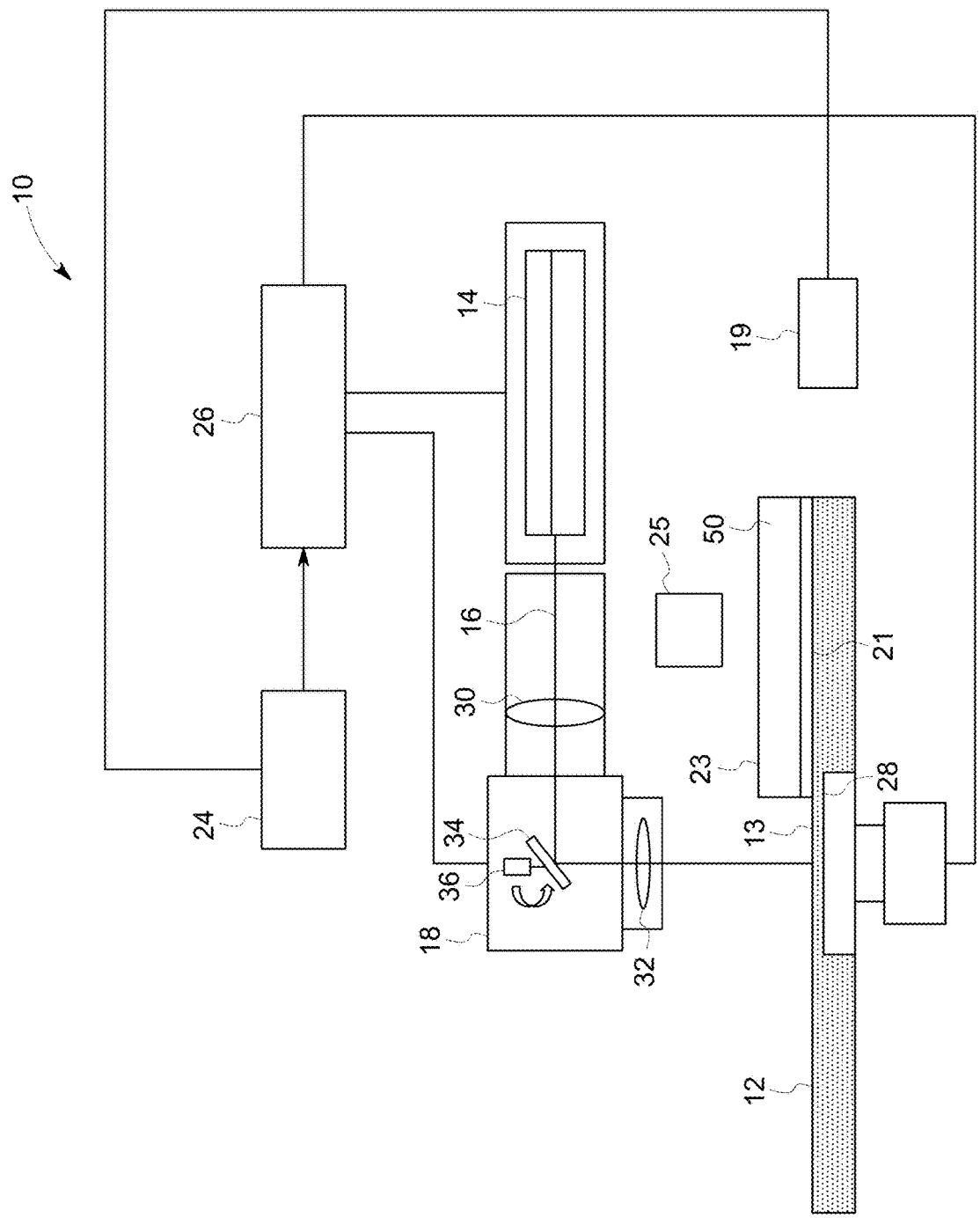
FIG. 1 is a schematic view of an exemplary additive manufacturing system shown in the form of a direct metal laser melting (DMLM) system including an exemplary build platform, recoater, and monitoring camera.

Unless otherwise indicated, the drawings provided herein are meant to illustrate features of embodiments of this disclosure. These features are believed to be applicable in a wide variety of systems comprising one or more embodiments of this disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

As used herein, the terms "processor" and "computer" and related terms, e.g., "processing device" and "computing device", are not limited to just those integrated circuits referred to in the art as a computer, but broadly refers to a microcontroller, a microcomputer, a programmable logic controller (PLC), an application specific integrated circuit, and other programmable circuits, and these terms are used interchangeably herein. In the embodiments described herein, memory may include, but is not limited to, a computer-readable medium, such as a random access memory (RAM), and a computer-readable nonvolatile medium, such as flash memory. Alternatively, a floppy disk, a compact disc-read only memory (CD-ROM), a magneto-optical disk (MOD), and/or a digital versatile disc (DVD) may also be used. Also, in the embodiments described herein, additional input channels may be, but are not limited to, computer peripherals associated with an operator interface such as a mouse and a keyboard. Alternatively, other computer peripherals may also be used that may include, for example, but not be limited to, a scanner. Furthermore, in the exemplary embodiment, additional output channels may include, but not be limited to, an operator interface monitor.

As used herein, the term "non-transitory computer-readable media" is intended to be representative of any tangible computer-based device implemented in any method or technology for short-term and long-term storage of information, such as, computer-readable instructions, data structures, program modules and sub-modules, or other data in any device. Therefore, the methods described herein may be encoded as executable instructions embodied in a tangible, non-transitory, computer readable medium, including, without limitation, a storage device and/or a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including, without limitation, volatile and nonvolatile media, and removable and non-removable media such as a firmware, physical and virtual storage, CD-ROMs, DVDs, and any other digital source such as a network or the Internet, as well as yet to be developed digital means, with the sole exception being a transitory, propagating signal.

Furthermore, as used herein, the term "real-time" refers to at least one of the time of occurrence of the associated events, the time of measurement and collection of predetermined data, the time to process the data, and the time of a system response to the events and the environment. In the embodiments described herein, these activities and events occur substantially instantaneously.

Embodiments of additive manufacturing systems with a monitoring camera described herein monitor the powder spreading process and detect defects in a component as the component is being manufactured. The system can then correct the forming defect before it becomes a larger defect. The additive manufacturing system includes a rotating build platform configured to rotate relative to a recoater. The additive manufacturing system also includes a powder distributer, a laser device, and the monitoring camera. The powder distributer deposits a powdered build material on the build platform, and the recoater spreads the powdered build material over the build platform. The laser device generates a laser beam directed to the powdered build material on the build platform to consolidate the powdered build material into a solid component. The monitoring camera is positioned proximate the rotating build platform to monitor the build platform and the recoater. Specifically, the camera generates a series of images of the recoater as it spreads the powdered build material over the build platform. The images are then analyzed to generate an output graph of a numerical representation of the images. Changes in the output graph may indicate defects are forming in the powder bed or the component or that the system has malfunctioned. For example, a dip in the output graph may indicate that a sink hole is developing in the top layer of the powder bed. The monitoring camera detects the forming sink hole, and the powder distributer deposits more powdered build material on the build platform to fill the sink hole. Thus, the monitoring camera detects defects or anomalies in the powder bed when they are forming, and enables the system to correct the forming defects during the manufacturing process.

Figure 2:
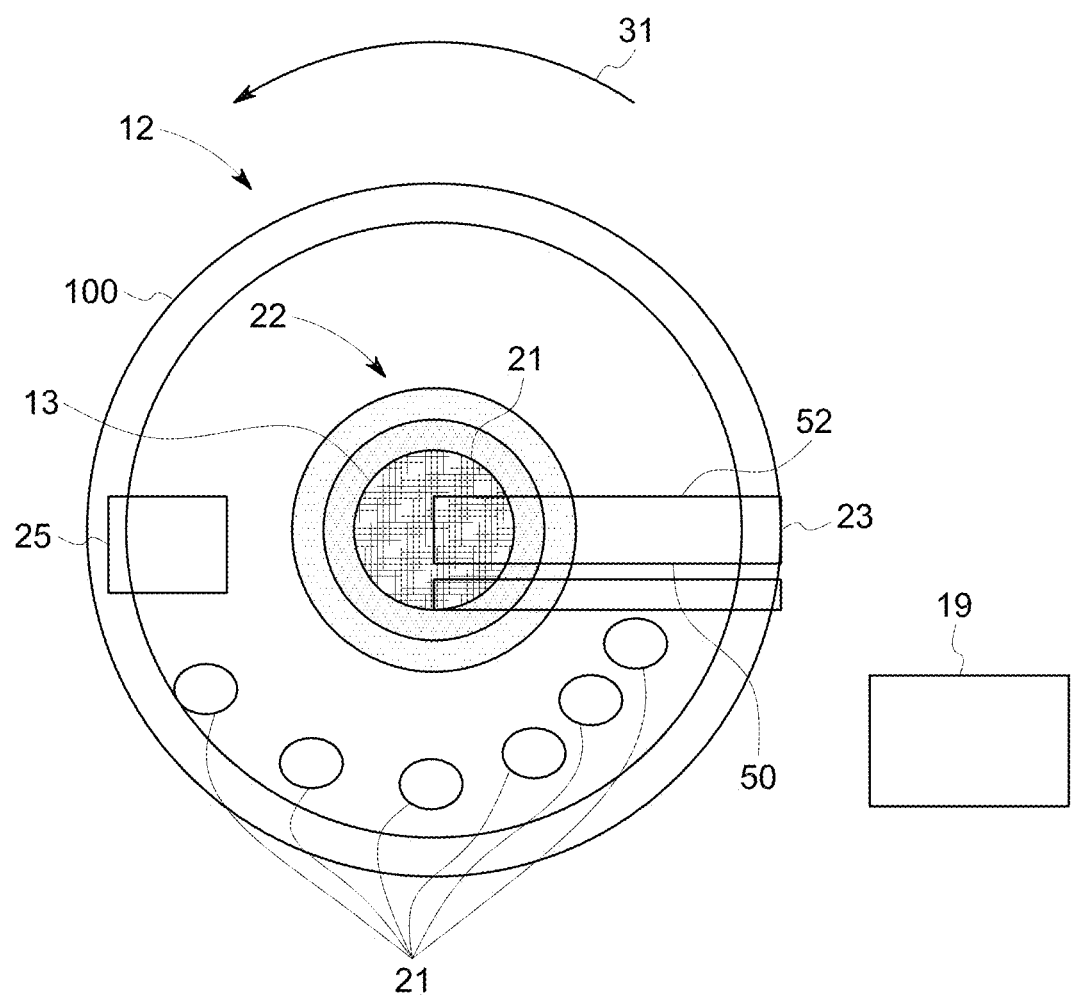
FIG. 2 is a schematic top view of an exemplary build platform, recoater, and monitoring camera of the additive manufacturing system shown in FIG. 1.

FIG. 1 is a schematic view of an exemplary additive manufacturing system 10 illustrated in the form of a direct metal laser melting (DMLM) system. FIG. 2 is a schematic top view of build platform 12, recoater 23, powder distributer 25, and monitoring camera 19 of DMLM system 10 shown in FIG. 1. Although the embodiments herein are described with reference to a DMLM system, this disclosure also applies to other types of additive manufacturing systems, such as selective laser sintering systems, or systems using electron beam as the consolidation energy source.

In the exemplary embodiment, as shown in FIG. 1, DMLM system 10 includes a build platform 12, a laser device 14 configured to generate a laser beam 16, and a scanning device 18 configured to selectively direct laser beam 16 across build platform 12. The exemplary DMLM system 10 also includes a recoater 23 configured to spread a powdered build material 21 across build platform 12 and a powder distributer 25 configured to deposit powdered build material 21 on build platform 12. DMLM system 10 also includes a monitoring camera 19 configured to monitor recoater 23 and build platform 12. DMLM system 10 further includes a computing device 24 and a controller 26 configured to control one or more components of DMLM system 10, as described in more detail herein.

As shown in FIGS. 1 and 2, build platform 12 includes powdered build material 21 that is melted and re-solidified during the additive manufacturing process to build a solid, consolidated component 28. Powdered build material 21 includes materials suitable for forming such components, including, without limitation, gas atomized alloys of cobalt, iron, aluminum, titanium, nickel, and combinations thereof.

In other embodiments, powdered build material 21 includes any suitable type of powdered build material. In yet other embodiments, powdered build material 21 includes any suitable build material that enables DMLM system 10 to function as described, including, for example and without limitation, ceramic powders, metal-coated ceramic powders, and thermoset or thermoplastic resins.

As shown in FIGS. 1 and 2, powder distributer 25 is positioned above build platform 12 and monitoring camera 19 is positioned proximate recoater 23 and build platform 12. Build platform 12 is configured to rotate to spread powdered build material 21. During operations, powder distributer 25 deposits powdered build material 21 on component 28 and build platform 12 forming a powder bed 13. Build platform 12 rotates as indicated by arrow 31. Powdered build material 21 deposited by powder distributer 25 rotates with build platform 12 and is spread on component 28 and build platform 12 by recoater 23 which does not rotate. As build platform 12 rotates, powdered build material 21 contacts recoater 23 which then spreads powdered build material 21 across a portion of build platform 12. As described in greater detail below, excess powdered build material 21 slides off of build platform 12. In the exemplary embodiment, build platform 12 has a circular shape. However, build platform 12 may have any shape which enables DMLM system 10 to operate as described herein. Further, although DMLM system 10 is shown and described as including a rotating build platform 12 and a stationary recoater 23, powder distributer 25, monitoring camera 19, and scanning device 18, DMLM system 10 may include any configuration of build platform 12, recoater 23, powder distributer 25, monitoring camera 19, and scanning device 18 that enables DMLM system 10 to operate as described herein. For example, in an alternative configuration, build platform 12 may be stationary while recoater 23, powder distributer 25, monitoring camera 19, and scanning device 18 rotate about build platform 12. In another alternative configuration, build platform 12, powder distributer 25, and scanning device 18 may be stationary while recoater 23 and monitoring camera 19 move across build platform 12. In other alternative configurations, recoater 23 moves relative to monitoring camera 19.

As shown in FIG. 1, laser device 14 is configured to generate a laser beam 16 of sufficient energy to at least partially melt powdered build material 21. In the exemplary embodiment, laser device 14 is a yttrium-based solid state laser configured to emit a laser beam having a wavelength of about 1070 nanometers (nm). In other embodiments, laser device 14 includes any suitable type of laser that enables DMLM system 10 to function as described herein, such as a carbon dioxide laser. Further, although DMLM system 10 is shown and described as including a single laser device 14 and a single powder distribution system, DMLM system 10 may include more than one laser device with a single powder recoating stage, or multiple laser devices with multiple recoating stages.

Laser device 14 is optically coupled to optical elements 30 and 32 that facilitate focusing laser beam 16 on build platform 12. In the exemplary embodiment, optical elements 30 and 32 include a beam collimator 30 disposed between the laser device 14 and scanning device 18, and an F-theta lens 32 disposed between the scanning device 18 and build platform 12. In other embodiments, DMLM system 10 includes any suitable type and arrangement of optical elements that provide a collimated and/or focused laser beam on build platform 12.

As shown in FIG. 1, scanning device 18 is configured to direct laser beam 16 across selective portions of build platform 12 to create solid component 28. In the exemplary embodiment, scanning device 18 is a galvanometer scanning device including a mirror 34 operatively coupled to a galvanometer-controlled motor 36 (broadly, an actuator). Motor 36 is configured to move, e.g., rotate, mirror 34 in response to signals received from controller 26, and thereby deflect laser beam 16 across selective portions of build platform 12. Mirror 34 has any suitable configuration that enables mirror 34 to deflect laser beam 16 towards build platform 12. In some embodiments, mirror 34 includes a reflective coating having a reflectance spectrum that corresponds to the wavelength of laser beam 16.

Although scanning device 18 is illustrated with a single mirror 34 and a single motor 36, scanning device 18 may include any suitable number of mirrors and motors that enable scanning device 18 to function as described herein. In one embodiment, scanning device 18 includes two mirrors and two galvanometer-controlled motors, each operatively coupled to one of the mirrors. In other embodiments, scanning device 18 includes any suitable scanning device that enables DMLM system 10 to function as described herein, such as, for example, two-dimension (2D) scan galvanometers, three-dimension (3D) scan galvanometers, and dynamic focusing galvanometers.

During operations, scanning device 18 directs laser beam 16 across selective portions of build platform 12 to create solid component 28. Specifically, laser beam 16 melts powdered build material 21, and powdered build material 21 cools into a layer of a solid, consolidated component 28. Once a layer has cooled into a portion of component 28, additional powdered build material 21 is spread over the layer to form a new layer. Accordingly, component 28 is consolidated layer by layer. As component 28 increases in height, powder distributer 25, recoater 23, monitoring camera 19, laser device 14, and scanning device 18 all rise to remain a predetermined distance above build platform 12. As such, during operations, powder distributer 25, recoater 23, monitoring camera 19, laser device 14, and scanning device 18 are all moving upward away from build platform 12 while build platform 12 is rotating. In an alternative configuration, build platform 12 moves downward and away from powder distributer 25, recoater 23, monitoring camera 19, laser device 14, and scanning device 18.

In the exemplary embodiment, a portion of powdered build material 21 is also consolidated into a particle containment wall 100 (shown in FIG. 2) on build platform 12 surrounding component 28. Specifically, particle containment wall 100 is consolidated as component 28 is consolidated. In the exemplary embodiment, particle containment wall 100 is generally circular and fully surrounds component 28. Additionally, in order to provide structural support for component 28 during the build process, powdered build material 21 fills the space between component 28 and particle containment wall 100. In alternative embodiments, particle containment wall 100 may be any shape that facilitates operation of DMLM system 10 as described herein.

As shown in FIG. 1, computing device 24 includes a computer system that includes at least one processing device (not shown in FIG. 1) and at least one memory device (not shown in FIG. 1) that executes executable instructions to operate DMLM system 10. Computing device 24 includes, for example, a calibration model of DMLM system 10 and an electronic computer build file associated with a component, such as component 28. The calibration model includes, without limitation, an expected or desired melt pool size and temperature under a given set of operating conditions (e.g., a power of laser device 14) of DMLM system 10. The build file includes build parameters that are used to control one or more components of DMLM system 10. Build parameters includes, without limitation, a power of laser device 14, a scan speed of scanning device 18, and a position and orientation of scanning device 18 (specifically, mirror 34). In the exemplary embodiment, computing device 24 and controller 26 are shown as separate devices. In other embodiments, computing device 24 and controller 26 are combined as a single device that operates as both computing device 24 and controller 26 as each are described herein.

Controller 26 includes any suitable type of controller that enables DMLM system 10 to function as described herein. In one embodiment, for example, controller 26 is a computer system that includes at least one processor and at least one memory device that executes executable instructions to control the operation of DMLM system 10 based at least partially on instructions from human operators. Controller 26 includes, for example, a 3D model of component 28 to be fabricated by DMLM system 10. Executable instructions executed by controller 26 includes controlling the power output of laser device 14, controlling a position and scan speed of scanning device 18, controlling a position and rotation rate of build platform 12, controlling a position and deposition rate of powdered distributer 25, and monitoring the spreading of powdered build material 21 onto build platform 12 with monitoring camera 19.

Controller 26 is configured to control one or more components of DMLM system 10 based on build parameters associated with a build file stored, for example, within computing device 24. In the exemplary embodiment, controller 26 is configured to control scanning device 18 based on a build file associated with a component to be fabricated with DMLM system 10. More specifically, controller 26 is configured to control the position, movement, and scan speed of mirror 34 using motor 36 based upon a predetermined path defined by a build file associated with component 28.

In the exemplary embodiment, computing device 24 and/or controller 26 are also configured to operate at least partially as a data acquisition device and to monitor the operation of DMLM system 10 during fabrication of component 28. In one embodiment, for example, computing device 24 and/or controller 26 receives and processes images from monitoring camera 19. Computing device 24 and/or controller 26 store and analyze the images, which are used to facilitate controlling and refining a build process for DMLM system 10 or for a specific component built by DMLM system 10.

In a first configuration, monitoring camera 19 is positioned proximate recoater 23 and build platform 12 and records images and/or video of a front 50 of recoater 23 spreading powdered build material 21 on build platform 12 and component 28. Monitoring camera 19 sends the recorded images to computing device 24 and/or controller 26 for analysis.

Figure 3:
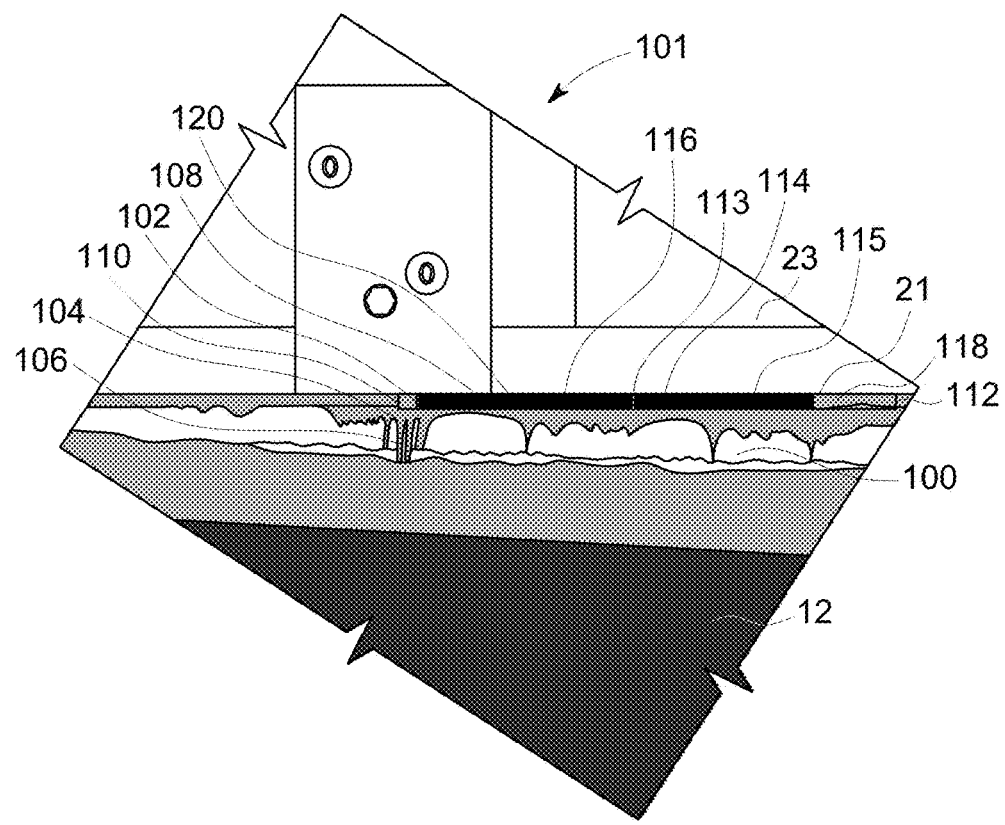
FIG. 3 is an image of the exemplary build platform and recoater of the additive manufacturing system shown in FIG. 1 acquired by the monitoring camera.

FIG. 3 is an exemplary image 101 acquired by monitoring camera 19 of recoater 23, build platform 12, and containment wall 100. Recoater 23 includes a recoater blade 102 extending from recoater 23 to powder bed 13 and component 28 (not shown in FIG. 3). In the exemplary embodiment, recoater blade 102 is a carbon brush that spreads powdered build material 21 over powder bed 13 and/or containment wall 100 and component 28. In alternative embodiments, recoater blade 102 may be any device that enables recoater 23 to operate as described herein. A stream of excess powdered build material 106 slides over component 28 and containment wall 100, onto build platform 12.

In the exemplary embodiment, image 101 is a gray scale image of recoater 23, build platform 12, and containment wall 100. As shown in FIG. 3, powdered build material 21 is lighter in color than recoater blade 102. As such, monitoring camera 19 differentiates powdered build material 21 from recoater blade 102 by detecting dark regions and light regions. Specifically, monitoring camera 19 detects dark regions and light regions within a region of interest (ROI) 108. In the exemplary embodiment, ROI 108 is a rectangular region within image 101 that extends from an outer edge 110 to an inner edge 112 of recoater blade 102 and from a bottom edge 113 of recoater blade 112 to a bottom edge 114 of recoater 23. Alternatively, ROI 108 extends from bottom edge 113 of recoater blade 112 to a ROI height 115 above powder bed 13. In the exemplary embodiment, ROI height 115 is about 0.1 millimeters to about 5 millimeters above top layer 104 of containment wall 100. However, ROI height 115 may be any height that enables DMLM system 10 to operate as described herein. When monitoring camera 19 detects a light region 116 within ROI 108, it is detecting powdered build material 21 in front of recoater blade 102. Conversely, when monitoring camera 19 detects a dark region 118 within ROI 108, it is detecting a lack of powdered build material 21 in front of recoater blade 102.

As shown in FIG. 3, powdered build material 21 forms an accumulation 120 of powdered build material 21 in front of recoater blade 102. Accumulation 120 of powdered build material 21 prevents monitoring camera 19 from viewing recoater blade 102, and, as such, monitoring camera 19 detects light regions 116 where accumulation 120 of powdered build material 21 is positioned in front of recoater blade 102. Typically, accumulation 120 of powdered build material 21 is centered where powder distributer 25 dispenses powdered build material 21 and trails off on either side. The shape of ROI 108 is determined by the shape of accumulation 120 of powdered build material 21. The shape of accumulation 120 of powdered build material 21 may change depending on which component 28 is being manufactured with DMLM system 10. Different components 28 have different geometries, and, as such, accumulation 120 of powdered build material 21 may have a different shape or different location based on the geometry of component 28. An operator may set the shape of ROI 108 to ensure that ROI 108 detects breaks in accumulation 120 of powdered build material 21.

While ROI 108 is shown as a rectangular region in image 101, ROI 108 may alternatively have any shape that enables monitoring camera 19 to operate as described herein. Specifically, the shape of ROI 108 can be any shape that allows monitoring camera 19 to detect breaks in accumulation 120 of powdered build material 21. For example, rather than a rectangle, ROI 108 may be a line extending from outer edge 110 to inner edge 112 of recoater blade 102.

In one embodiment, monitoring camera 19 is positioned proximate build platform 12 such that monitoring camera 19 is configured to image ROI 108, for example, a region that extends from outer edge 110 to inner edge 112 of recoater blade 102 and from bottom edge 113 of recoater blade 112 to ROI height 115. Alternatively, monitoring camera 19 may be positioned at any location relative to build platform 12, component 28, recoater 23, and/or containment wall 100 that enables monitoring camera 19 to operate as described herein. For example, in a second configuration shown in FIG. 7, monitoring camera 19 may be positioned proximate build platform 12 such that monitoring camera 19 is configured to image a back 52 of recoater blade 102.

During operations, defects in powder bed 13, component 28, and/or containment wall 100, defects in recoater 23, or interruptions in the flow of powdered build material 21 from powder distributer 25 may reduce accumulation 120 of powdered build material 21 such that gaps within accumulation 120 of powdered build material 21 allow monitoring camera 19 to detect recoater blade 102. For example, a sink hole may develop within powder bed 13, top layer 104 of component 28, and/or containment wall 100. Powdered build material 21 may fall into the sink hole, causing gaps in accumulation 120 of powdered build material 21. Additionally, interruptions in the flow of powdered build material 21 from powder distributer 25 may cause gaps in accumulation 120 of powdered build material 21 as well. Defects in recoater 23 may also cause gaps in accumulation 120 of powdered build material 21. Specifically, portions of recoater 23 may become worn such that holes develop in recoater 23. Powdered build material 21 may be passed through the holes in recoater 23 rather than accumulate in front of recoater 23. Monitoring camera 19 detects the gaps in accumulation 120 of powdered build material 21 caused by sink holes, interruptions in the flow of powdered build material 21, and/or holes in recoater 23.

Figure 4:
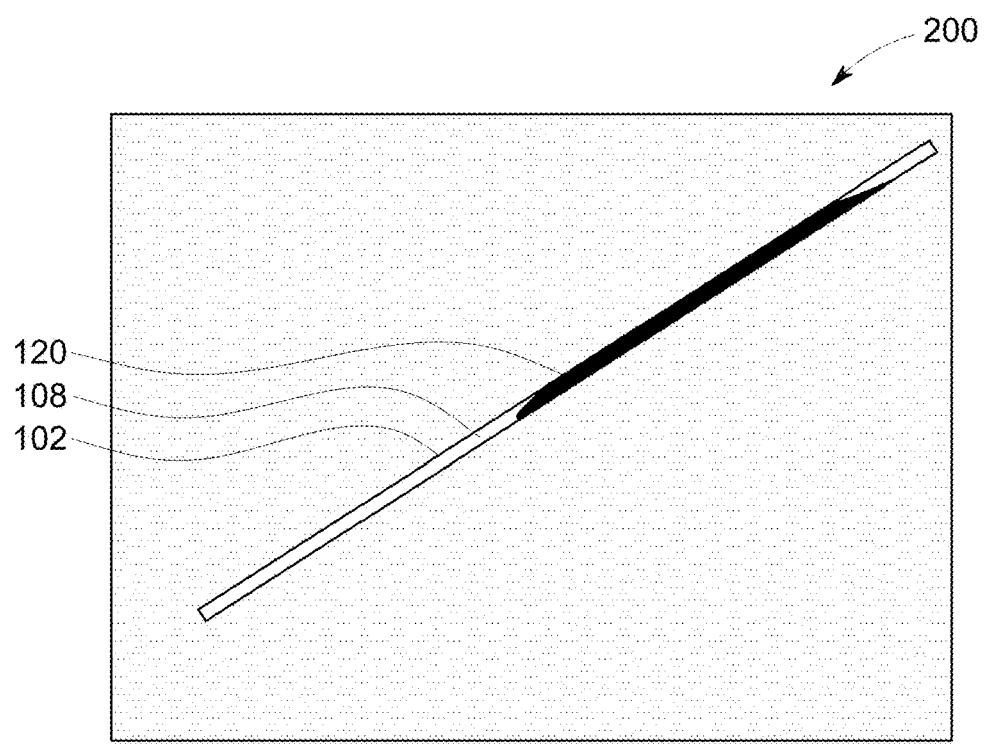
FIG. 4 is an binary image of the exemplary region of interest shown in FIG. 3 acquired by the monitoring camera.

Monitoring camera 19 sends images 101 to computing device 24 and/or controller 26 to be analyzed. Specifically, computing device 24 and/or controller 26 convert image 101 into a binary image 200 (shown in FIG. 4). Computing device 24 and/or controller 26 then convert data within image 200 into an output graph 300 (shown in FIG. 5) of a numerical representation of image 200. FIG. 4 is binary image 200 of image 101 shown in FIG. 3 acquired by the monitoring camera 19. Computing device 24 and/or controller 26 isolate ROI 108 in image 101 such that only ROI 108 is shown in image 200. Computing device 24 and/or controller 26 detect accumulation 120 of powdered build material 21 within ROI 108 and converts the detected accumulation 120 of powdered build material 21 into a digital format that can be analyzed. Computing device 24 and/or controller 26 then converts the digital information into output graph 300 (shown in FIG. 5). The powdered build material 21 accumulated against recoater blade 102 is distinguished from the surrounding by its appearance in images 101 and 200 acquired by monitoring camera 19. Powdered build material 21 may have a light reflectivity and scattering characteristics that are different from those of the surrounding objects, specifically recoater blade 102, and thus appear darker or lighter than recoater blade 102. Powdered build material 21 may also be different in color, and thus the contrast between powdered build material 21 and the surrounding objects may be enhanced by use of a color camera and/or colored filters. Additionally, the contrast between powdered build material 21 and the surrounding objects may be enhanced by use of polarized light illumination and a polarization filtering on monitor camera 19. Special lighting conditions, such as incidence angles, may be manipulated to improve the contrast between powdered build material 21 and the surrounding objects.

Figure 5:
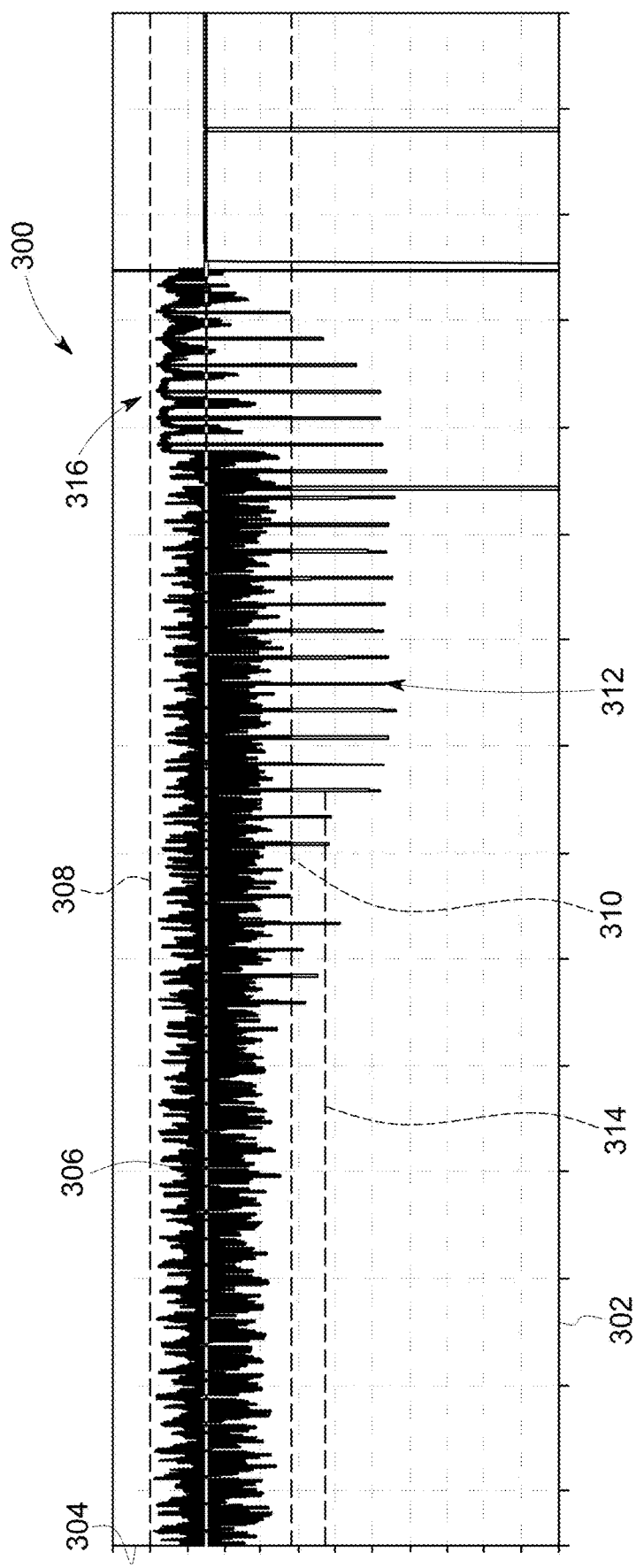
FIG. 5 is an output graph of a numerical representation of the binary image shown in FIG. 4.

FIG. 5 is an output graph 300 of a numerical representation of image 200 shown in FIG. 4. An x-axis 302 of output graph 300 represents time, and a y-axis 304 of output graph 300 represents amplitude. Alternatively, x-axis 302 of output graph 300 may represent build layers instead of time. An amplitude plot 306 of the digital information within image 200 is shown in FIG. 5. Amplitude plot 306 is a plot of the amplitude of the digital information from image 200. An operator and/or controller 26 sets an upper limit 308 and a lower limit 310 on amplitude plot 306 based on the past performance of DMLM system 10. The amplitude reported on y-axis 304 of output graph 300 is an area of ROI 108 that is determined to be covered by powdered build material 21 within ROI 108 defined around outer edge 110 and inner edge 112 of recoater blade 102. If lack of powder defects begin to develop, accumulation 120 of powdered build material 21 against recoater blade 102 diminishes, resulting in a smaller relative area of recoater blade 102 covered by accumulation 120 of powdered build material 21. ROI 108 may be subdivided into smaller sections and several parameters that characterize the powder spreading process may be extracted. For example, a parameter may be created that compares accumulation 120 of powdered build material 21 at outer edge 110 of recoater blade 102 to accumulation 120 of powdered build material 21 at inner edge 112 of recoater blade 102. Similarly, a parameter may be created that compares accumulation 120 of powdered build material 21 at top layer 104 of containment wall 100 to accumulation 120 of powdered build material 21 at bottom edge 114 of recoater 23. Additionally, a shape of accumulation 120 of powdered build material 21 may also be quantified with a length and a height of accumulation 120 of powdered build material 21, or a cross-sectional height at different position along accumulation 120 of powdered build material 21. Furthermore, other areas in the field of view could be monitored to provide useful feedback on the process. For example, stream of excess powdered build material 106 may be quantified to assess the amount of powdered build material 21 being falling off containment wall 100, or the integrity of the containment wall 100 can be deduced from the view of containment wall 100 within images 101 and 200. More generally, a quantitative response of images 101 and 200 by computing device 24 may be extracted by means of various machine learning techniques that enhance robustness and detectability of anomalies in the process. An algorithm executed by computing device 24 may be trained using a volume of data collected for a variety of known events occurring during manufacture of prior components 28.

As shown in FIG. 5, a plurality of dips 312 in amplitude plot 306 appear after DMLM system 10 has been operating for an amount of time 314. Dips 312 are caused by a sink hole developing within powder bed 21. Specifically, powdered build material 21 falls into the sink hole as the sink hole forms. A gap forms in accumulation 120 of powdered build material 21 because powdered build material 21 falls into the sink hole rather than accumulating in front of recoater 23. In the exemplary embodiment, because build platform 12 is circular and rotates, the sink hole rotates under recoater 23 periodically. As such, the gap in accumulation 120 of powdered build material 21 disappears and reappears with each rotation. Monitoring camera 19 detects the gap in accumulation 120 of powdered build material 21 with each rotation.

Controller 26 detects dips 312 and alerts an operator that the amplitude of amplitude plot 306 has decreased below lower limit 310. In response, the operator increases the flow of powdered build material 21 from powder distributer 25. The increased flow of powdered build material 21 gradually fills in the sink hole and increases the amplitude of amplitude plot 306. The increased flow of powdered build material 21 causes a period 316 of increased amplitude of amplitude plot 306. Dips 312 gradually disappear as the excess powdered build material 21 fills the sink hole. As such, monitoring camera 19 monitors the recoating process, controller 26 alerts the operator of potential defects, and the operator to diagnoses and addresses any potential defects before they become large defects.

Figure 6:
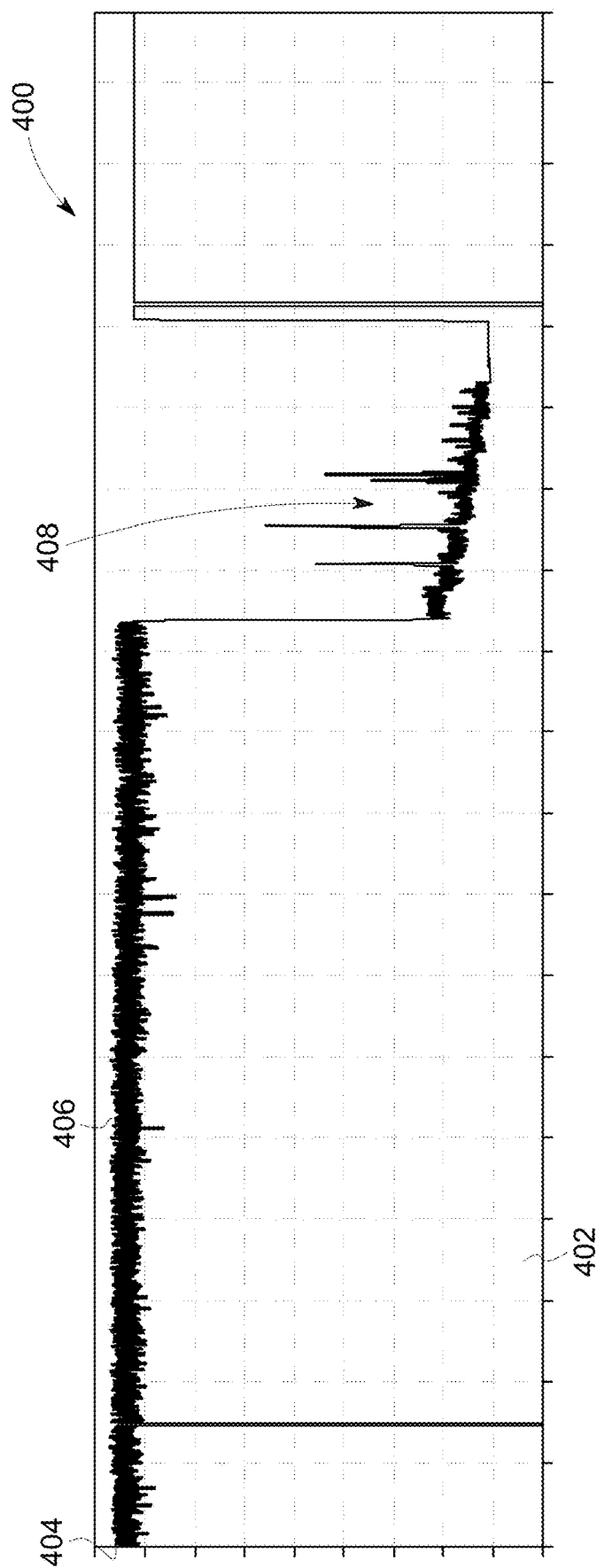
FIG. 6 is an output graph of a numerical representation of the binary image shown in FIG. 4.

FIG. 6 is an output graph 400 of a numerical representation of image 200 shown in FIG. 4. An x-axis 402 of output graph 400 represents time, and a y-axis 404 of output graph 400 represents amplitude. An amplitude plot 406 of the digital information within image 200 is shown in FIG. 6. Output graph 400 is substantially similar to output graph 300 except that output graph 400 shows an amplitude dip 408 caused by an interruption of powdered build material 21 from powder distributer 25. The decreased flow of powdered build material 21 causes accumulation 120 of powdered build material 21 to decrease. The reduction in accumulation 120 of powdered build material 21 causes the amplitude of amplitude plot 406 to decrease as shown by dip 408. Controller 26 detects dip 408 and alerts the operator that the flow of powdered build material 21 has been interrupted. In response, the operator stops DMLM system 10. As such, monitoring camera 19 monitors the recoating process, controller 26 alerts the operator of potential defects, and the operator diagnoses and addresses any potential defects before they become large defects.

As shown in FIGS. 5 and 6, monitoring the change in amplitude in amplitude plots 306 and 406 may alert controller 26 and an operator of different types of potential defects in powder bed 13 and/or component 28. Periodic dips 312 in amplitude plot 306 generally indicate that a sink hole has developed within powder bed 13 and/or component 28. A large constant dip 408 generally indicates that the flow of powdered build material 21 from powder distributer 25 has been interrupted. As such, monitoring camera 19 not only monitors for defects, but also helps controller 26 and/or an operator diagnose the defects that may develop.

Figure 7:
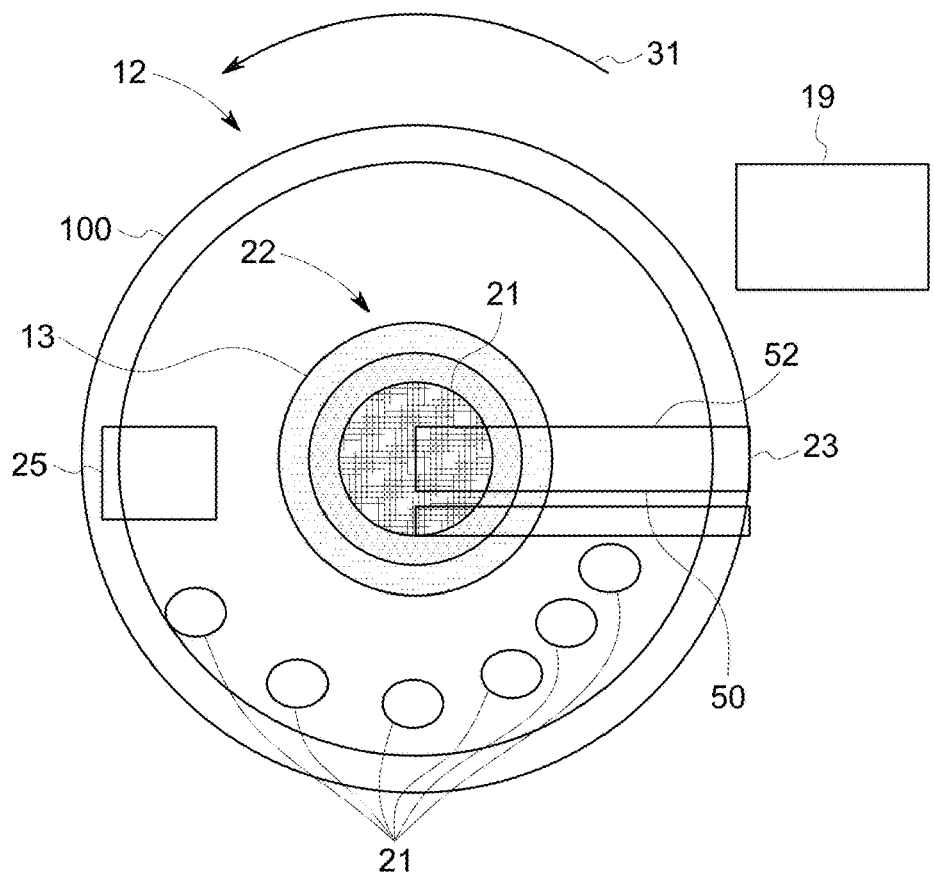
FIG. 7 is a schematic top view of an exemplary build platform, recoater, and monitoring camera of the additive manufacturing system shown in FIG. 1 in an alternative configuration.

FIG. 7 is a schematic top view of build platform 12, recoater 23, powder distributer 25, and monitoring camera 19 of DMLM system 10 shown in FIG. 1 in a second configuration. As shown in FIG. 7, monitoring camera 19 is positioned proximate build platform 12 such that monitoring camera 19 is configured to image back 52 of recoater blade 102. Similar to the first configuration described above, ROI 108 is defined on back 52 of recoater 23. However, in contrast to the first configuration, ROI 108 is substantially free of powdered build material 21 during normal operations. If recoater 23 becomes worn, gaps within recoater 23 may develop such that powdered build material 21 flows into the gaps rather than being spread on build platform 12. Monitoring camera 19 then detects powdered build material 21 within ROI 108, indicating gaps within recoater 23 and wear to recoater 23. Similar to the first configuration, controller 26 detects the gaps and alerts an operator that recoater 23 may be worn and may need to be replaced. Accordingly, the second configuration enables monitoring camera 19 and controller 26 to detect wear on recoater 23.

Figure 8:
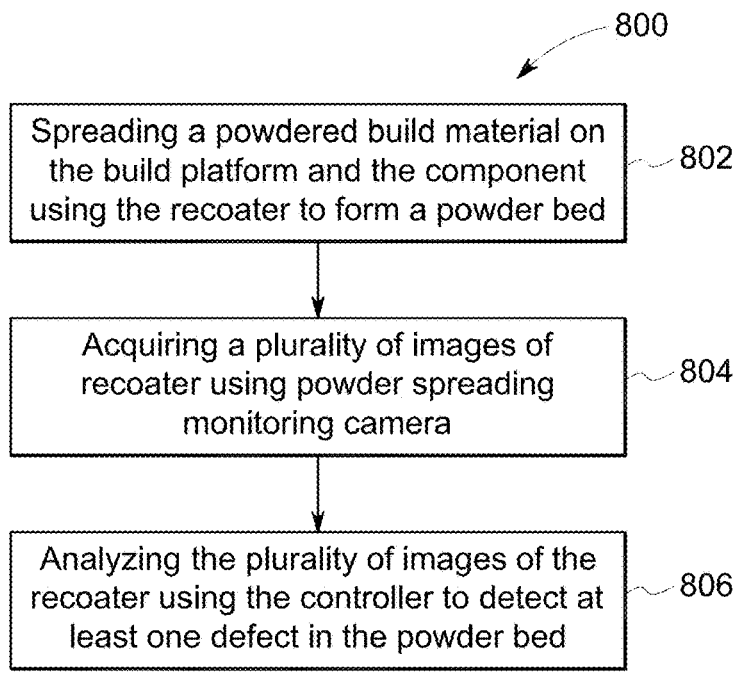
FIG. 8 is a flow diagram of a method of manufacturing a component with the additive manufacturing system shown in FIG. 1.

FIG. 8 is a flow diagram of a method 800 of manufacturing component 28 with DMLM system 10. DMLM system 10 includes build platform 12, recoater 23, monitoring camera 19, and controller 26. Component 28 is disposed on build platform 12. Method 800 includes spreading 802 powdered build material 21 on build platform 12 and component 28 using recoater 23. Method 800 also includes acquiring 804 a plurality of images 101 of recoater 23 using monitoring camera 19. Method 800 further includes analyzing 806 images 101 of recoater 23 with controller 26 to detect at least one defect in component 28.

Embodiments of additive manufacturing systems with a monitoring camera described herein monitor a powder spreading process and detect defects in a component as the component is being manufactured. The system can then correct the forming defect before it becomes a large defect. The additive manufacturing system includes a rotating build platform configured to rotate relative to a recoater. The additive manufacturing system also includes a powder distributer, a laser device, and the monitoring camera. The powder distributer deposits a powdered build material on the build platform, and the recoater spreads the powdered build material over the build platform. The laser device generates a laser beam directed to the powdered build material on the build platform to consolidate the powdered build material into a solid component. The monitoring camera is positioned proximate the rotating build platform to monitor the build platform and the recoater. Specifically, the camera generates a series of images of the recoater as it spreads the powdered build material over the build platform. The images are then analyzed to generate an output graph of a numerical representation of the images. Changes in the output graph may indicate defects are forming in the component or that the system has malfunctioned. For example, a dip in the output graph may indicate that a sink hole is developing in the top layer of the consolidated component. The monitoring camera detects the forming sink hole, and the powder distributer deposits more powdered build material on the build platform to fill in the sink hole. Thus, the monitoring camera detects defects in the components when they are forming, and enables the system to correct the forming defects during the manufacturing process.

An exemplary technical effect of the methods and systems described herein includes: (a) imaging the recoating process; (b) analyzing the images of the recoating process; (c) detecting defects in a component; and (d) reducing defects in a component.

Some embodiments involve the use of one or more electronic or computing devices. Such devices typically include a processor, processing device, or controller, such as a general purpose central processing unit (CPU), a graphics processing unit (GPU), a microcontroller, a reduced instruction set computer (RISC) processor, an application specific integrated circuit (ASIC), a programmable logic circuit (PLC), a field programmable gate array (FPGA), a digital signal processing (DSP) device, and/or any other circuit or processing device capable of executing the functions described herein. The methods described herein may be encoded as executable instructions embodied in a computer readable medium, including, without limitation, a storage device and/or a memory device. Such instructions, when executed by a processing device, cause the processing device to perform at least a portion of the methods described herein. The above examples are exemplary only, and thus are not intended to limit in any way the definition and/or meaning of the term processor and processing device.

Exemplary embodiments of additive manufacturing systems having monitoring cameras are described above in detail. The apparatus, systems, and methods are not limited to the specific embodiments described herein, but rather, operations of the methods and components of the systems may be utilized independently and separately from other operations or components described herein. For example, the systems, methods, and apparatus described herein may have other industrial or consumer applications and are not limited to practice with additive manufacturing systems as described herein. Rather, one or more embodiments may be implemented and utilized in connection with other industries.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. An additive manufacturing system configured to manufacture a component, said additive manufacturing system comprising:
   a build platform, the component disposed on said build platform;
   a recoater comprising a recoater blade configured to spread a powdered build material across said build platform and the component forming a powder bed;
   a monitoring camera positioned to image said recoater blade, said monitoring camera configured to acquire a plurality of images of said recoater blade; and
   a controller configured to receive said plurality of images from said monitoring camera, wherein said controller is further configured to identify a region of interest in each image of the plurality of images and identify an accumulation of the powdered build material in the region of interest, and wherein said controller is configured to detect defects in the powder bed based on the accumulation of the powdered build material in the region of interest in said plurality of images received from said monitoring camera.

2. The additive manufacturing system in accordance with claim 1, wherein the region of interest extends from an outer edge of said recoater blade to an inner edge of said recoater blade and from a region of interest height to a bottom edge of recoater blade.

3. The additive manufacturing system in accordance with claim 1, wherein said controller is further configured to detect the powdered build material between said recoater blade and said monitoring camera in said plurality of images received from said monitoring camera.

4. The additive manufacturing system in accordance with claim 1, further comprising a containment wall circumscribing the component.

5. The additive manufacturing system in accordance with claim 4, wherein said monitoring camera is further configured to image said containment wall.

6. A controller for use in an additive manufacturing system including a build platform, a recoater, a monitoring camera, and a controller, the recoater including a recoater blade, the monitoring camera positioned to image the recoater blade, the monitoring camera further configured to acquire a plurality of images of the recoater blade, said controller including a processing device and a memory device coupled to said processing device, said controller configured to:
   receive the plurality of images from the monitoring camera;
   identify a region of interest in each image of the plurality of images;
   identify an accumulation of the powdered build material in the region of interest; and
   analyze the plurality of images of the recoater to detect at least one defect in a powder bed based on the accumulation of the powdered build material in the region of interest in the plurality of images received from the monitoring camera.

7. The controller in accordance with claim 6, wherein the region of interest extends from an outer edge of the recoater blade to an inner edge of the recoater blade and from a region of interest height to a bottom edge of recoater blade.

8. The controller in accordance with claim 6, wherein said controller is further configured to produce a plurality of binary images based on the plurality of images.

9. The controller in accordance with claim 8, wherein the region of interest is isolated in each binary image of the plurality of binary images.

10. The controller in accordance with claim 8, wherein said controller is further configured to identify the accumulation of the powdered material between the recoater blade and the monitoring camera in the plurality of binary images.

11. The controller in accordance with claim 8, wherein said controller is further configured to generate an output graph based on the plurality of binary images.

12. A method of manufacturing a component with an additive manufacturing system, the additive manufacturing system including a build platform, a recoater, a monitoring camera, and a controller, the recoater including a recoater blade, the monitoring camera positioned to image the recoater blade, the monitoring camera configured to acquire a plurality of images of the recoater blade, the component is disposed on the build platform, said method comprising:
   spreading a powdered build material on the build platform and the component using the recoater to form a powder bed;
   acquiring the plurality of images of the recoater using the monitoring camera;
   identify a region of interest in each image of the plurality of images;
   identify an accumulation of the powdered build material in the region of interest; and
   analyzing the plurality of images of the recoater using the controller to detect at least one defect in the powder bed based on the accumulation of the powdered build material in the region of interest in the plurality of images received from the monitoring camera.

13. The method of claim 12, further comprising rotating the build platform relative to the recoater.

14. The method of claim 12, further comprising dispensing the powdered build material on the build platform and the component.

15. The method of claim 12, further comprising determining an amount of powered build material to dispense based on the plurality of images of the recoater.

16. The method of claim 12, further comprising detecting the powdered build material between the recoater blade and the monitoring camera in the plurality of images received from the monitoring camera.

* * * * *